(12) United States Patent
Perlman

(10) Patent No.: US 8,538,014 B2
(45) Date of Patent: Sep. 17, 2013

(54) FAST COMPUTATION OF ONE-WAY HASH SEQUENCES

(75) Inventor: Radia J. Perlman, Sammamish, WA (US)

(73) Assignee: Oracle America, Inc., Redwood Shores, CA (US)

(*) Notice: Subject to any disclaimer, the term of this patent is extended or adjusted under 35 U.S.C. 154(b) by 962 days.

(21) Appl. No.: 12/118,893

(22) Filed: May 12, 2008

(65) Prior Publication Data
US 2009/0279692 A1    Nov. 12, 2009

(51) Int. Cl.
*H04L 9/28* (2006.01)

(52) U.S. Cl.
USPC .............................. 380/28; 380/262; 380/44

(58) Field of Classification Search
USPC .............................................. 380/28, 262, 44
See application file for complete search history.

(56) References Cited

U.S. PATENT DOCUMENTS

| | | | | |
|---|---|---|---|---|
| 7,120,249 | B2* | 10/2006 | Roberts | 380/44 |
| 7,257,711 | B2* | 8/2007 | Goodrich et al. | 713/176 |
| 7,743,252 | B2* | 6/2010 | Ramzan et al. | 713/168 |
| 7,788,728 | B2* | 8/2010 | Kim et al. | 726/30 |
| 8,140,824 | B2* | 3/2012 | Craft | 711/217 |
| 2003/0041082 | A1* | 2/2003 | Dibrino | 708/501 |
| 2003/0126400 | A1* | 7/2003 | Debiez et al. | 711/216 |
| 2005/0053045 | A1* | 3/2005 | Chmora et al. | 370/338 |
| 2006/0248340 | A1* | 11/2006 | Lee et al. | 713/181 |
| 2008/0126805 | A1* | 5/2008 | Owlett et al. | 713/176 |

* cited by examiner

*Primary Examiner* — Jung Kim
*Assistant Examiner* — Thomas Ho
(74) *Attorney, Agent, or Firm* — Park, Vaughan, Fleming & Dowler, LLP

(57) ABSTRACT

Some embodiments of the present invention provide a system that computes a target secret $S_t$ in a sequence of secrets $S_0 \ldots S_n$. During operation, the system obtains k hash functions $h_1, \ldots, h_k$, where $h_1$ is known as the "lowest order hash function", and $h_k$ is known as the "highest order hash function." Associated with each hash function $h_i$ is a seed value seed comprising a pair (seedindex$_i$, seedvalue$_i$). Hash function $h_i$ operates on a pair (index$_i$, value$_i$) to produce a pair (newindex$_i$, newvalue$_i$), where newindex$_i$>index$_i$. To compute target secret $S_t$, the hash functions are applied successively, starting with the highest order hash function whose associated seed's index value is largest without being greater than t, applying that hash function as many times as possible without having that hash function's output's index value become greater than t, and then applying each successive hash function in turn as many times as possible, until $S_t$ has been computed. To delete the earliest computable secret in the chain, $S_1$, the new seed for each of the hash functions is computed as follows. Let x=1+index$_1$, (the index of the seed associated with the lowest order hash function). For each hash function $h_i$, if x>index$_i$, then $h_i$ is applied to seed$_i$. If the resulting index$_i$ is greater than index$_{i+1}$, then (index$_{i+1}$, value$_{i+1}$) associated with hash$_{i+1}$ is copied into the (index, value) associated with hash$_i$. Otherwise, seed is replaced by $h_i$(seed$_i$).

18 Claims, 3 Drawing Sheets

FAST COMPUTATION OF ONE-WAY HASH SEQUENCES

BACKGROUND

1. Field

The present invention relates to techniques for managing an ordered sequence of secrets in limited space in such a way that, at any time, items can be efficiently deleted from the beginning of the sequence, all items in the sequence later than the earliest saved secret can be efficiently computed, and items earlier than the earliest saved secret are infeasible to compute.

2. Related Art

In order to protect sensitive data from unauthorized access, organizations commonly store sensitive data in encrypted form. If the encrypted data needs to be accessed, it must be decrypted using a decryption key. However, such decryption keys can, over time, be obtained by an adversary through compromise or coercion. To remedy this problem, keys can be stored in tamper-resistant smart cards, in which case it is not feasible to covertly discover the keys.

However, smart cards have limited storage space, which makes it impractical (if not impossible) to store a large number of keys on the smart card. Additionally, smart cards have very limited computational speed, which makes it impractical to perform a large number of computations to compute a given secret. These restrictions significantly limit the capabilities of a system that uses a smart card to manage keys.

One technique for achieving the effect of storing a large number of sequential keys (secrets) with limited storage, such that deleted keys cannot be recovered, is to use a hash chain. (Note that we use the terms "key" and "secret" interchangeably throughout this specification.) A traditional cryptographic hash chain is one in which each member of the hash chain is derivable from the previous member. So starting from an initial value, x, the next member is h(x), and the next is h(h(x)), and so on. This technique requires n consecutive applications of the function h to get to the n+1st value.

Using a traditional hash chain, the smart card could store just a single secret, but then it is prohibitively slow to compute a secret n units into the future, because that would require, through traditional techniques, n iterations of the hash function.

Another technique for achieving the effect of storing a large number of secrets with limited storage, such that deleted keys cannot be recovered, is described in patent application Ser. No. 11/405,980, entitled "Method and Apparatus for Securely Forgetting Secrets" by inventors Radia J. Perlman and Anton B. Rang filed on 17 Apr. 2006. In this technique, two secrets are maintained at any time on the smart card. These secrets include: a "current secret," $S_i$, and a "next secret," $S_j$. A set of other secrets can be stored outside the card, encrypted with $S_j$. Any of the externally stored secrets can be accessed by retrieving it from external storage and decrypting with $S_j$. To delete one of the externally stored secrets, the card retrieves each externally stored secret in turn, decrypts it with $S_j$, encrypts it with $S_{j+1}$, and stores the result externally from the card. After re-encrypting every one of the externally stored secrets (except the ones to be deleted), the smart card destroys $S_j$. (Note that if the card can only remember one secret at a time, $S_{j+1}$ can be a one-way hash of $S_j$). This technique is efficient for accessing future secrets, but unfortunately, is slow to delete a secret, because the entire database of secrets must be accessed, decrypted, and then re-encrypted.

Hence, what is needed is a method and an apparatus that can maintain a large number of sequential secrets with relatively small storage and computational ability, such that items can be efficiently and irrevocably deleted from the beginning of the sequence, and any item later in the sequence can be efficiently accessed.

SUMMARY

Some embodiments of the present invention provide a system that computes a target secret $S_t$ in a sequence of secrets $S_0 \ldots S_n$. During operation, the system obtains k hash functions $h_1, \ldots, h_k$, where $h_1$ is known as the "lowest order hash function", and $h_k$ is known as the "highest order hash function". Associated with each hash function $h_i$ is a seed value seed comprising a pair (seedindex$_i$, seedvalue$_i$). Hash function $h_i$ operates on a pair (index$_i$, value$_i$) to produce a pair (newindex$_i$, newvalue$_i$), where newindex$_i$>index$_i$. To compute target secret $S_t$, the hash functions are applied successively, starting with the highest order hash function whose associated seed's index value is largest without being greater than t, applying that hash function as many times as possible without having that hash function's output's index value become greater than t, and then applying each successive hash function in turn as many times as possible, until $S_t$ has been computed.

To delete the earliest computable secret in the chain, $S_1$, the new seed for each of the hash functions is computed as follows. Let x=1+index$_1$, (the index of the seed associated with the lowest order hash function). For each hash function $h_i$, if x>index$_i$, then $h_i$ is applied to seed$_i$. If the resulting index$_i$ is greater than index$_{i+1}$, then the (index$_{i+1}$, value$_{i+1}$) associated with hash$_{i+1}$ is copied into the (index, value) associated with hash$_i$. Otherwise, seed$_i$ is replaced by $h_i$(seed$_i$).

In some embodiments, the system additionally uses $S_t$ as an encryption key to encrypt sensitive data D, and stores the encrypted data on a computer-readable storage medium.

In some embodiments, applying $h_i$ increments the index by $10^{i-1}$. In other words, $h_1$ increments the index by 1, $h_2$ increments the index by 10, and $h_k$ increments the index by $10^{k-1}$, and each hash is applied sequentially, starting with the highest order hash, between zero and nine times when computing $S_t$.

In some embodiments, the hash increments of the seeds indices are powers of $n^{1/k}$, namely $n^{0/k}, n^{1/k}, n^{2/k}, \ldots, n^{(k-1)/k}$.

In some embodiments, obtaining the k hash functions $h_1, \ldots, h_k$ involves deriving the k hash functions from a single hash function h(x), wherein a given derived hash function $h_i$ is computed by: concatenating x and "i" to form x|"i"; and computing $h_i(x)=h(x|"i")$.

DETAILED DESCRIPTION

Figure 1:
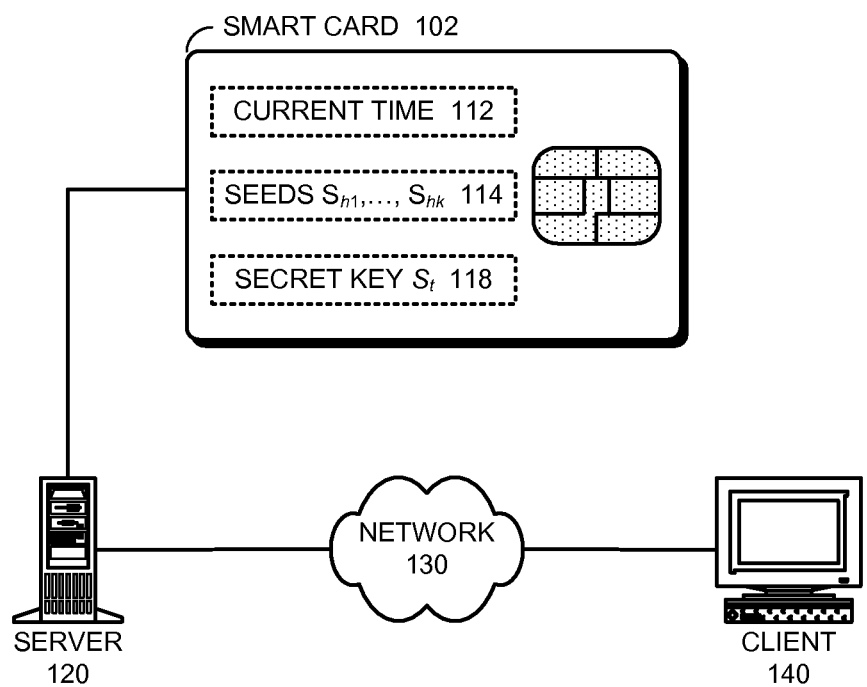
FIG. 1 illustrates a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

One-Way Hash Sequences

In some applications, such as where data has expiration dates, data for each expiration date is encrypted with different a key. Moreover, it must be efficient to access or compute keys for any future date, in order to read files that have not expired, but not to be able to access or compute keys for files that have expired. This can be accomplished with limited storage space and limited computational power by using a sequence of secrets which we refer to as a "one-way hash sequence".

More specifically, embodiments of the present invention achieve the effect of storing n sequential secrets (keys) on the smart card, in such a way that once the smart card forgets all the secrets earlier than $S_i$, they are unrecoverable. Moreover, it is always possible to derive any future secret.

A traditional method for accomplishing this would be to use a hash chain, but that would take n operations to access the $n^{th}$ value. Embodiments of the present invention instead take advantage of a time/space tradeoff to store more information, but save computation. Suppose we have space to store k secrets and we have k hash functions, $h_1, \ldots, h_k$. (Note that it is well-known how to create a family of hash functions from a single hash function. This can be done by concatenating the message to be hashed with a different constant for each hash function. So, for instance, if we have a function h(x), we could make $h_1(x)=h(x|"1")$, and $h_2(x)=h(x|"2")$, wherein "|" means "concatenated with".)

While generating a secret, embodiments of the present invention use: the hash function $h_1$ to skip by ones; the hash function $h_2$ to skip by a larger number, such as the $k^{th}$ root of n; the hash function $h_3$ to skip by an even larger number, such as the square of the $k^{th}$ root of n, and so on.

For example, assume we want to access 10,000 logical secrets, and we can only store four seed (index, value) pairs. (Note that the $4^{th}$ root of 10,000 is 10.) We start by storing the seeds $(0, S_0)$, $(10, S_{10})$, $(100, S_{100})$, and $(1000, S_{1000})$. In this example, we assume that we want to be able to access 10,000 logical secrets $S_0, S_1, \ldots S_{9999}$. Moreover, the zero$^{th}$ secret is $S_0$, the value of the $10^{th}$ secret $S_{10}$ is $h_2(S_0)$, the $100^{th}$ secret $S_{100}$ is $h_3(S_0)$, and the $1000^{th}$ secret $S_{1000}$ is $h_4(S_0)$, and likewise for larger numbers. For example, the $3000^{th}$ secret, $S_{3000}$, is $h_4(S_{2000})$, $S_{2100}$ is $h_3(S_{2000})$, $S_{2010}$ is $h_2(S_{2000})$, and $S_{2001}$ is $h_1(S_{2000})$. Once the smart card forgets $S_{2000}$ it is no longer possible to derive future values without storing the smallest seeds for $h_1$, $h_2$, $h_3$, and $h_4$ that are still valid.

To generate a specific value $S_k$, the function $h_4$ (skipping by 1000's) is applied to the seed $S_{h4}$ for hash function $h_4$ as many times as possible without the index exceeding k, then the function $h_3$ is applied to the result (skipping by 100's), (or to its own seed, if $S_{h4}$'s index exceeded k), again as many times as possible without the index exceeding k, then the function $h_2$ is applied (skipping by 10's), and finally the function $h_1$ is applied to reach the index k, and the value $S_k$.

The smart card stores four seed (index, value) pairs: (1) the (index, value) pair with smallest still accessible index I and the associated value, (2) the ($I_2$, value) pair where $I_2$ is the smallest multiple of 10 index greater than I, (3) the ($I_3$, value) pair where 13 is the smallest multiple of 100 index greater than $I_2$, and (4) the ($I_4$, value) pair where $I_4$ is the smallest multiple of 1000 index greater than 13. For example, at some point, the smallest index might be 27, and the corresponding value, $S_{27}$. In this case, the smart card would store $(27, S_{27})$, $(30, S_{30})$, $(100, S_{100})$, and $(1000, S_{1000})$. To obtain the value of say, $S_{8476}$, the function $h_4$ would be applied 7 times to $S_{1000}$ to obtain $S_{8000}$. The function $h_3$ would be applied four times to $S_{8000}$ to obtain $S_{8400}$. The function $h_2$ would be applied seven times to $S_{8400}$ to obtain $S_{8470}$. Finally, the function $h_1$ would be applied six times to $S_{8470}$ to obtain $S_{8476}$.

In the example above, n=10000, and k=4, wherein the 4th root of n is 10. So each successive h jumps 10 times as far as the previous one (the first jumps by 1, the next by 10, the next by 100, the next by 1000).

The maximum number of iterations of hashing that would be needed is then k times the $k^{th}$ root of n. In our example, if we start with $S_0$, it requires 9 iterations of each of the hash functions to obtain the value $S_{9999}$. There is no requirement to use the partitioning ($k^{th}$ root) which is described above. There might be reasons, for instance, to make earlier values more quickly computable, and therefore, have smaller jumps for the earlier h's.

In general, the only requirement is that the hash functions be ordered, and to compute a given secret in the sequence, the hash functions are applied sequentially, starting with the highest-order hash applied to the seed associated with that hash function, as many times as possible without exceeding the index of the target secret, and continuing with each next-lower-order hash function, until the target secret is reached. It is not necessary for the skip interval applied to the index to be a constant for a given hash function. For instance, $h_2(x)$ could skip first by 10, then 9, then 10, then 7, until the index reaches a number equal to or greater than the index of the seed for the next higher order hash function. Alternatively, the skip value could also depend on the value of the seed, for instance, using the bottom digit (in decimal) of the current computed value to determine how many times to skip, except that $h_1(x)$ would skip by 1's. In other words, $h_2(x)$ could be defined as follows: if $S_{20}$=9837, because the bottom digit of 9837 is "7", the next value that $h_2(x)$ would skip to is $S_{27}$. Furthermore, if $S_{27}=h_2(9837)=1529$, then the next skip would be 9, so $h_2(S_{27})$ would skip to $S_{36}$. In fact, to minimize the worst case number of hash operation, it is better to have a hash function start with larger jumps (after being initialized) and have each application of the hash function jump by a smaller amount, until the next time it is initialized by being copied from the seed value of a higher order hash function. For simplicity of explanation, in the remainder of this description, we describe exemplary hash functions that always increment the index by a constant. However, the present invention is not meant to be limited to such hash functions.

The gist of this invention is getting the effect of a large chain of one-way hashes with limited storage by storing k secrets, and having k hash functions, each of which skips by a certain amount. The first will skip by one, the next will skip by some larger integer than that, the third will skip by some larger integer than that, etc.

Hence, we first start from the seed (index, value) for the highest order hash function for which the seed's index is less than the target index, jumping through the sequence of secrets in the chain, to get to the secret with the largest index still not greater than the target index value. Then we iterate, using the successively lower order hashes.

System

FIG. 1 illustrates a system which makes use of a one-way hash sequence in accordance with an embodiment of the present invention. Note that this system only illustrates one possible implementation of a system that uses a one-way hash sequence. In general, the present invention can be used in any system which generates and maintains a sequence of secrets (such as encryption/decryption keys) in a limited amount of space in such a way that keys earlier in the sequence can be deleted, and once deleted, cannot be recovered.

More specifically, FIG. 1 illustrates a system including a smart card 102 which is coupled to a server 120 in accordance with an embodiment of the present invention. As is illustrated in FIG. 1, server 120 communicates with client 140 over network 130. This enables server 120 to service requests form client 140.

Smart card 102 can include any type of tamper-resistant computational device. Also, note that the present invention is not limited to systems that use smart cards.

Server 120 can generally include any computational node including a mechanism for servicing requests from client 140 for computational and/or data storage resources. Moreover, server 120 can include any type of computer system, including, but not limited to, a computer system based on a microprocessor, a mainframe computer, a digital signal processor, a portable computing device, a personal organizer, a device controller, and a computational engine within an appliance.

Network 130 can generally include any type of wired or wireless communication channel capable of coupling together computing nodes. This includes, but is not limited to, a local area network, a wide area network, or a combination of networks. In one embodiment of the present invention, network 130 includes the Internet.

Client 140 can generally include any node on a network including computational capability and including a mechanism for communicating across the network.

During operation, server 120 services requests from client 140. While servicing these requests, server 120 makes requests to smart card 102 to perform various operations that make use of one or more keys (secrets). For example, the operations can be encryption and decryption operations.

In order to perform these operations, smart card 102 uses keys from a "one-way hash sequence." A one-way hash sequence is similar to a hash chain in that a given key in the sequence is derivable from one of the preceding keys in the sequence. However, a one-way hash sequence differs from a hash chain in that the given key is not necessarily derivable from an immediately preceding key in the sequence.

Referring to FIG. 1, smart card 102 maintains a secret key $S_t$ 118 which can be used to decrypt encrypted data. In one embodiment of the present invention, the secret key $S_t$ 118 belongs to a hash sequence $S_1, S_2, \ldots$ and is associated with an expiration time t.

Smart card 102 also maintains seeds $(index_1, S_{h1}), \ldots, (index_k, S_{hk})$ 114, which are associated with hash functions $h_1(index, x), \ldots, h_k(index, x)$, respectively, wherein for a given seed $(index_i, S_{hi})$, $index_i$ is the smallest multiple of a corresponding skip value $sv_i$ associated with hash function $h_i(index, x)$, wherein $index_i$ is greater than or equal to the index of the lowest-numbered existing secret $S_{lowest}$. These seeds can be used to generate a target secret in a hash sequence as is described in more detail below.

Note that the seeds $(index_1, S_{h1}), \ldots, (index_k, S_{hk})$ 114 include an index for each seed in addition to the actual value for each seed. For example, if the lowest numbered secret $S_{lowest}$ is $S_{272}$, the system can maintain the following values for seeds $S_{h1}, S_{h2}, S_{h3}$ and $S_{h4}$: $S_{h1}$=(index=272, value=938409), $S_{h2}$=(index=280, value=495873), $S_{h3}$=(index=300, value=27489) and $S_{h4}$=(index=1000, value=156723).

In one embodiment of the present invention, smart card 102 additionally maintains a current time indicator 112, which is used to keep track of the current time. This current time indicator 112 facilitates deleting a key when the expiration time for the key is reached. Note that current time indicator 112 can reference an external time base, which is located outside of smart card 102, or alternatively, can reference an internal clock, which keeps track of time within smart card 102.

Generating a Secret

Figure 2:
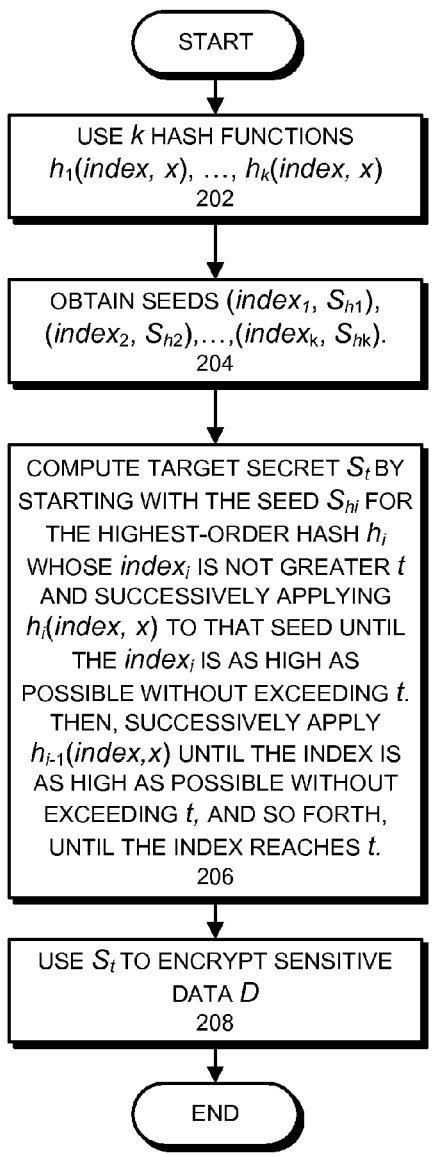
FIG. 2 presents a flow chart illustrating the process of generating a target secret in accordance with an embodiment of the present invention.

FIG. 2 presents a flow chart illustrating the process of generating a target secret $S_t$ in a sequence of secrets $S_0 \ldots S_n$ in accordance with an embodiment of the present invention. During operation, the system uses k hash functions $h_1(index, x), \ldots, h_k(index, x)$ (step 202). Note that hash functions $h_1(index, x), \ldots, h_k(index, x)$ are associated with skip values $sv_1, \ldots, sv_k$, respectively, wherein a given skip value $sv_i$ specifies how many secrets in the sequence the associated hash function $h_i(index, x)$ skips, and the value added to the index when that hash function is applied. The system also obtains one or more seeds $(index_1, S_{h1}), (index_2, S_{h2}), \ldots, (index_k, S_{hk})$ (step 204) for hash functions $h_1(index, x), \ldots, h_k(index, x)$, respectively. For a given seed $S_{hi}$, the lowest order seed includes the index and value of the lowest-numbered existing secret $S_{lowest}$, and for the other seeds, the corresponding $index_i$ is the smallest multiple of $sv_i$ which is greater than the index of the next lower order seed's index.

Next, the system computes the target secret $S_t$ by starting with the seed $S_{hi}$ for the highest-order hash $h_i(index, x)$ whose $index_i$ is not greater than t, and successively applying $h_i(index, x)$ to that seed zero or more times until $index_i$ is as high as possible without exceeding t. Then, successively applying $h_{i-1}(index, x)$ to that pair zero or more times until the index is as high as possible without exceeding t, and so forth until the index reaches t (step 206). For example, assume that we start by storing the seeds $(0, S_0), (10, S_{10}), (100, S_{100})$ and $(1000, S_{1000})$, which are associated with hash functions $h_1(index, x), h_2(index, x), h_3(index, x)$ and $h_4(index, x)$, respectively, wherein $h_1$ skips by 1, $h_2$ skips by 10, $h_3$ skips by 100 and $h_4$ skips by 1000. Next, assume that at some point in time the smallest value is $S_{572}$ and the seeds $(572, S_{572}), (580, S_{580}), (600, S_{600})$, and $(1000, S_{1000})$ are stored in the smart card. To produce a target secret $S_{1234}$, we start with (1000, $S_{1000}$) (not needing to apply $h_4$ at all), then apply $h_3$ twice to get to $S_{1200}$, then apply $h_2$ three times to get to $S_{1230}$, and then apply $h_1$ four times to get to $S_{1234}$.

Next, referring back to FIG. 2, in one embodiment of the present invention, the system uses $S_t$ as an encryption key to encrypt sensitive data D, and stores the encrypted data on a computer-readable storage medium (step 208).

Generating Seeds

Figure 3:
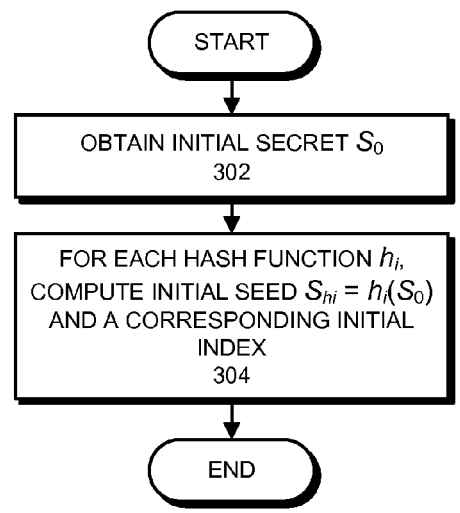
FIG. 3 presents a flow chart illustrating the process of generating initial seeds for the hash functions in accordance with an embodiment of the present invention.

FIG. 3 presents a flow chart illustrating the process of generating initial seeds for the hash functions in accordance with an embodiment of the present invention. First, the system starts by obtaining an initial secret $S_0$ (step 302). Next, for each hash function $h_i$, the system computes an initial seed $S_{hi}=h_i(S_0)$ and a corresponding initial index (step 304).

For example, assume that we start with hash functions $h_1$, $h_2$, $h_3$ and $h_4$, respectively, wherein $h_1$ skips by 1, $h_2$ skips by 10, $h_3$ skips by 100 and $h_4$ skips by 1000. We start with an initial secret $S_0$, which for example can be obtained from a random-number generator. Next, we generate $S_{10}$ by computing $h_2(S_0)$; we generate $S_{100}$ by computing $h_3(S_0)$; and we generate $S_{1000}$ by computing $h_4(S_0)$. We also generate the corresponding indices: $index_1=1$, $index2=10$, $index_3=100$ and $index_4=1000$.

Note that in this specification, while referring to a hash function, the notation $h_i$ (with no parameters) or the notation $h_i(S_j)$ (with a single parameter) are sometimes used as shorthand to represent the hash function $h_i(index, S_j)$ (with two parameters).

Deleting a Secret

Figure 4:
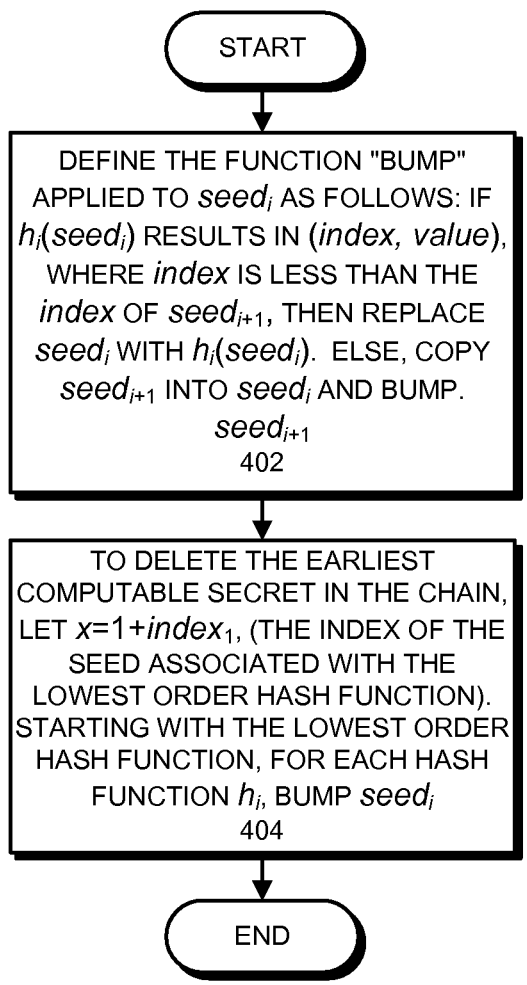
FIG. 4 presents a flow chart illustrating the process of deleting a secret in accordance with an embodiment of the present invention.

FIG. 4 presents a flow chart illustrating the process of deleting a secret in accordance with an embodiment of the present invention. To delete the earliest computable secret in the chain, $S_1$, the new seeds for each of the hash functions are computed as follows. Define the function "bump" applied to $seed_i$ to be as follows: if $h_i(seed_i)$ results in (index, value), where index is less than the index of $seed_{i+1}$, then replace $seed_i$ with $h_i(seed_i)$. Else, copy $seed_{i+1}$ into $seed_i$ and bump $seed_{i+1}$ (step 402). Now, to delete the earliest computable secret in the chain, let $x=1+index_1$, (the index of the seed associated with the lowest order hash function). Starting with the lowest order hash function, for each hash function $h_i$, bump $seed_i$ (step 404). After this operation, the indices for the seeds will be strictly increasing.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for computing a target secret $S_t$ in a sequence of secrets $S_0 \ldots S_n$, the method comprising:
    using a computer to perform operations for:
        obtaining k hash functions $h_1, \ldots, h_k$;
        obtaining one or more seeds $(index_1, S_{h1}), \ldots, (index_k, S_{hk})$ for hash functions $h_1, \ldots, h_k$, respectively, wherein the first component in the seed, index, is the index of a secret $S_i$, and the second component in the seed $S_{hi}$ is the value of that secret in the sequence of secrets $S_0 \ldots S_n$;
        computing $S_t$ by starting with a seed which precedes $S_t$, wherein the seed that precedes $S_t$ corresponds to a highest-order hash $h_i$ for which a corresponding index is not greater than t, and successively applying each hash function $h_k, \ldots, h_1$ a corresponding number of times to produce $S_t$; and
        storing $S_t$ in a computer memory;
    wherein the hash functions $h_1, \ldots, h_k$ are ordered, with $h_1$ being the lowest order hash function and $h_k$ being the highest order hash function, and applied in order from highest order to lowest order, wherein the index of the seed for a higher order hash function is greater than or equal to the indices of the seeds for lower order hash functions;
    wherein computing $S_t$ involves starting with the highest-order hash function's corresponding seed for which the index is not greater than t, and successively applying each hash function, starting with that hash function and proceeding sequentially through the lower-order hash functions to produce $S_t$;
    wherein, for each hash function, the number of times the hash function is applied to compute $S_t$ is determined using t and the index for the hash function;
    wherein hash functions $h_1, \ldots, h_k$ are associated with an increasing sequence of skip values $sv_1, \ldots, sv_k$, respectively, wherein a given skip value $sv_i$ specifies how many secrets in the sequence the associated hash function $h_i(x)$ skips; and
    wherein for a given seed $S_{hi}$ in the one or more seeds $S_{h1}, \ldots, S_{hk}$, the associated $index_i$ is the smallest multiple of $sv_i$ which is greater than the index of the lowest-numbered existing secret $S_{lowest}$.

2. The method of claim 1, further comprising:
    using $S_t$ as an encryption key to encrypt sensitive data D; and
    storing the encrypted data on a computer-readable storage medium.

3. The method of claim 1, wherein successively applying each hash function $h_k, h_{k-1}, \ldots, h_1$ involves applying each hash function zero or more times in decreasing order of associated skip values $sv_k, \ldots, sv_1$, so that the highest skip value is applied first and the lowest skip value is applied last.

4. The method of claim 3,
    wherein the skip values $sv_1, \ldots, sv_k$ are powers of $n^{1/k}$, namely $n^{0/k}, n^{1/k}, n^{2/k}, \ldots, n^{k-1}$; and
    wherein each skip value is applied between zero and $(n^{1/k}-1)$ times when computing $S_t$.

5. The method of claim 1, further comprising deleting a lowest-numbered existing secret $S_{lowest}$ so that $S_{lowest}$ cannot be recovered by:
    computing $x=1+index_1$, wherein $index_1$ is the index associated with the lowest order hash function $h_1$;
    for each hash function $h_i$,
        if $x>index_i$,
            applying $h_i$ to $seed_i$;
            if the resulting $index_i$ is greater than $index_{i+1}$, copying the $(index_{i+1}, value_{i+1})$ associated with $h_{i+1}$ into the $(index_i, value_i)$ associated with $h_i$; and
            otherwise, replacing $seed_i$ with $h_i(seed_i)$.

6. The method of claim 1, wherein obtaining the one or more seeds $S_{h1}, \ldots, S_{hk}$, involves initializing the one or more seeds by:
    obtaining an initial secret $S_0$; and
    for each hash function $h_i$, computing a corresponding initial value for the seed $S_{hi}=h_i(S_0)$ and setting an initial for the index for the seed, $index_i$, to be the index of the initial value of $S_{hi}$ in the sequence of secrets $S_0 \ldots S_n$.

7. The method of claim 1, wherein obtaining the k hash functions $h_1(x), \ldots, h_k(x)$ involves deriving the k hash functions from a single hash function h(x), wherein a given derived hash function $h_i(x)$ is computed by:
concatenating x and "i" to form x|"i"; and
computing $h_i(x)=h(x|"i")$.

8. A non-transitory computer-readable storage medium storing instructions that when executed by a computer cause the computer to perform a method for computing a target secret $S_t$ in a sequence of secrets $S_0 \ldots S_n$, the method comprising:
obtaining k hash functions $h_1, \ldots, h_k$;
obtaining one or more seeds $(index_1, S_{h1}), \ldots, (index_k, S_{hk})$ for hash functions $h_1, \ldots, h_k$, respectively, wherein the first component in the seed, $index_i$, is the index of a secret $S_j$, and the second component in the seed $S_{hi}$ is the value of that secret in the sequence of secrets $S_0 \ldots S_n$; and
computing $S_t$ by starting with a seed which precedes $S_t$, wherein the seed that precedes $S_t$ corresponds to a highest-order hash $h_i$ for which a corresponding index is not greater than t, and successively applying each hash function $h_k, \ldots, h_1$ a corresponding number of times to produce $S_t$;
wherein the hash functions $h_1, \ldots, h_k$ are ordered, with $h_1$ being the lowest order hash function and $h_k$ being the highest order hash function, and applied in order from highest order to lowest order, wherein the index of the seed for a higher order hash function is greater than or equal to the indices of the seeds for lower order hash functions;
wherein computing $S_t$ involves starting with the highest-order hash function's corresponding seed for which the index is not greater than t, and successively applying each hash function, starting with that hash function and proceeding sequentially through the lower-order hash functions to produce $S_t$;
wherein, for each hash function, the number of times the hash function is applied to compute $S_t$ is determined using t and the index for the hash function;
wherein hash functions $h_1, \ldots, h_k$ are associated with an increasing sequence of skip values $sv_1, \ldots, sv_k$, respectively, wherein a given skip value $sv_i$ specifies how many secrets in the sequence the associated hash function $h_i(x)$ skips; and
wherein for a given seed $S_{hi}$ in the one or more seeds $S_{h1}, \ldots, S_{hk}$, the associated $index_i$ is the smallest multiple of $sv_i$ which is greater than the index of the lowest-numbered existing secret $S_{lowest}$.

9. The computer-readable storage medium of claim 8, wherein the method further comprises:
using $S_t$ as an encryption key to encrypt sensitive data D; and
storing the encrypted data on a computer-readable storage medium.

10. The computer-readable storage medium of claim 8, wherein successively applying each hash function $h_k, h_{k-1}, \ldots, h_1$ involves applying each hash function zero or more times in decreasing order of associated skip values $sv_k, \ldots, sv_1$, so that the highest skip value is applied first and the lowest skip value is applied last.

11. The computer-readable storage medium of claim 10, wherein the skip values $sv_1, \ldots, sv_k$ are powers of $n^{1/k}$, namely $n^{0/k}, n^{1/k}, n^{2/k}, \ldots, n^{k-1}$; and
wherein each skip value is applied between zero and $(n^{1/k}-1)$ times when computing $S_t$.

12. The computer-readable storage medium of claim 8, wherein the method further comprises deleting a lowest-numbered existing secret $S_{lowest}$ so that $S_{lowest}$ cannot be recovered by:
computing $x=1+index_1$, wherein $index_1$ is the index associated with the lowest order hash function $h_1$;
for each hash function $h_i$,
if $x>index_i$,
applying $h_i$ to $seed_i$;
if the resulting $index_i$ is greater than $index_{i+1}$, copying the $(index_{i+1}, value_{i+1})$ associated with $h_{i+1}$ into the $(index_i, value_i)$ associated with $h_i$; and
otherwise, replacing $seed_i$ with $h_i(seed_i)$.

13. The computer-readable storage medium of claim 8, wherein obtaining the one or more seeds $S_{h1}, \ldots, S_{hk}$, involves initializing the one or more seeds by:
obtaining an initial secret $S_0$; and
for each hash function $h_i(x)$, computing a corresponding initial value for the seed $S_{hi}=h_i(S_0)$ and setting an initial for the index for the seed, $index\_S_{hi}$, to be the index of the initial value of $S_{hi}$ in the sequence of secrets $S_0 \ldots S_n$.

14. The computer-readable storage medium of claim 8, wherein obtaining the k hash functions $h_1(x), \ldots, h_k(x)$ involves deriving the k hash functions from a single hash function h(x), wherein a given derived hash function $h_i(x)$ is computed by:
concatenating x and "i" to form x|"i"; and
computing $h_i(x)=h(x|"i")$.

15. A system that computes a target secret $S_t$ in a sequence of secrets $S_0 \ldots S_n$, the method comprising:
a computing mechanism configured to compute k hash functions $h_1, \ldots, h_k$; and
a memory storing one or more seeds $(index_1, S_{h1}), \ldots, (index_k, S_{hk})$ for hash functions $h_1, \ldots, h_k$, respectively, wherein the first component in the seed, $index_i$, is the index of a secret $S_j$, and the second component in the seed $S_{hi}$ is the value of that secret in the sequence of secrets $S_0 \ldots S_n$;
wherein the computing mechanism is configured to compute $S_t$ by starting with a seed which precedes $S_t$, wherein the seed that precedes $S_t$ corresponds to a highest-order hash $h_i$ for which a corresponding index is not greater than t, and successively applying each hash function $h_k, \ldots, h_1$ a corresponding number of times to produce $S_t$;
wherein the hash functions $h_1, \ldots, h_k$ are ordered, with $h_1$ being the lowest order hash function and $h_k$ being the highest order hash function, and applied in order from highest order to lowest order, wherein the index of the seed for a higher order hash function is greater than or equal to the indices of the seeds for lower order hash functions;
wherein computing $S_t$ involves starting with the highest-order hash function's corresponding seed for which the index is not greater than t, and successively applying each hash function, starting with that hash function and proceeding sequentially through the lower-order hash functions to produce $S_t$;
wherein, for each hash function, the number of times the hash function is applied to compute $S_t$ is determined using t and the index for the hash function;
wherein hash functions $h_1, \ldots, h_k$ are associated with an increasing sequence of skip values $sv_1, \ldots, sv_k$, respectively, wherein a given skip value $sv_i$ specifies how many secrets in the sequence the associated hash function $h_i(x)$ skips; and wherein for a given seed $S_{hi}$ in the one or more seeds $S_{h1}, \ldots, S_{hk}$, the associated index$_i$ is the smallest multiple of sv$_i$ which is greater than the index of the lowest-numbered existing secret $S_{lowest}$.

16. The system of claim 15,
wherein hash functions $h_1, \ldots, h_k$ are associated with an increasing sequence of skip values $sv_1, \ldots, sv_k$, respectively, wherein a given skip value sv$_i$ specifies how many secrets in the sequence the associated hash function $h_i(x)$ skips; and wherein for a given seed $S_{hi}$ in the one or more seeds $S_{h1}, \ldots, S_{hk}$, the associated index$_i$ is the smallest multiple of sv$_i$ which is greater than the index of the lowest-numbered existing secret $S_{lowest}$.

17. The method of claim 1, wherein each of the hash functions corresponds to a different order of magnitude for $S_t$, and wherein, for each hash function, the number of times the hash function is applied to compute $S_t$ is determined using a difference between a value for the order of magnitude for $S_t$ corresponding to the hash value and a value for the order of magnitude of the index for the hash function.

18. The method of claim 1, wherein each of the hash functions corresponds to a position for a digit of $S_t$, wherein each of the hash functions corresponds to a different position, and wherein, for each hash function, the number of times the hash function is applied to compute $S_t$ is determined using a difference between a value for a digit of t at a position corresponding to the hash function and a value for a digit of the index for the hash function at a position corresponding to the hash function.

* * * * *